(12) United States Patent
Das et al.

(10) Patent No.: US 10,580,432 B2
(45) Date of Patent: Mar. 3, 2020

(54) SPEECH RECOGNITION USING CONNECTIONIST TEMPORAL CLASSIFICATION

(71) Applicant: Microsoft Technology Licensing, LLC, Redmond, WA (US)

(72) Inventors: Amit Das, Redmond, WA (US); Jinyu Li, Redmond, WA (US); Rui Zhao, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/908,115

(22) Filed: Feb. 28, 2018

(65) Prior Publication Data

US 2019/0267023 A1 Aug. 29, 2019

(51) Int. Cl.
*G10L 25/30* (2013.01)
*G10L 15/16* (2006.01)
*G10L 15/183* (2013.01)
*G10L 15/06* (2013.01)
*G06F 16/35* (2019.01)
*G06F 16/31* (2019.01)

(52) U.S. Cl.
CPC ............ *G10L 25/30* (2013.01); *G06F 16/313* (2019.01); *G06F 16/35* (2019.01); *G10L 15/063* (2013.01); *G10L 15/16* (2013.01); *G10L 15/183* (2013.01); *G10L 2015/0635* (2013.01)

(58) Field of Classification Search
CPC ....... G10L 25/30; G10L 15/063; G10L 15/16; G10L 15/183; G10L 2015/0635; G06F 16/313; G06F 16/35
See application file for complete search history.

(56) References Cited

U.S. PATENT DOCUMENTS

| 10,229,672 B1 * | 3/2019 | Rao ......................... G10L 15/16 |
| 2017/0004824 A1 * | 1/2017 | Yoo ..................... G06F 17/2818 |
| 2018/0253648 A1 * | 9/2018 | Kaskari ................. G06N 3/084 |
| 2018/0330718 A1 * | 11/2018 | Hori ....................... G10L 15/16 |
| 2019/0267023 A1 * | 8/2019 | Das ....................... G10L 15/063 |

* cited by examiner

*Primary Examiner* — Nafiz E Hoque
(74) *Attorney, Agent, or Firm* — Schwegman Lundberg & Woessner, P.A.

(57) ABSTRACT

Generally discussed herein are devices, systems, and methods for speech recognition. Processing circuitry can implement a connectionist temporal classification (CTC) neural network (NN) including an encode NN to receive an audio frame and generate a current encoded hidden feature vector, an attend NN to generate, based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, an annotate NN to generate the current, second context vector based on the weight vector, the current encoded hidden feature vector, the previous encoded hidden feature vector, and the future encoded hidden feature vector, and a normal NN to generate a normalized output vector based on the context vector.

20 Claims, 6 Drawing Sheets

SPEECH RECOGNITION USING CONNECTIONIST TEMPORAL CLASSIFICATION

BACKGROUND

Speech recognition enables a translation of spoken language into text, Speech recognition uses knowledge from linguistics, electrical engineering, and computer science to perform the translation. Speaker dependent speech recognition techniques are tailored to a specific person. Such techniques are trained using audio from the specific person. Speaker independent speech recognition techniques operate regardless of who is speaking. Speaker independent speed) recognition techniques can be trained on a more universal set of audio that includes multiple people speaking. A speaker independent speech recognition technique is advantageous from a user standpoint. The speaker independent speech recognition technique can be trained prior to installation, thus making training invisible to the user. In contrast, a speaker dependent speech recognition technique requires the specific person to speak into a microphone for training.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Processing circuitry can be configured to implement a connectionist temporal classification (CTC) neural network (NN), the CTC NN comprising an encode NN to receive an audio frame as input and generate a current encoded hidden feature vector as output, an attend NN to generate, based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, an annotate NN to generate the current, second context vector based on the weight vector, the current encoded hidden feature vector, the previous encoded hidden feature vector, and the future encoded hidden feature vector, and a normal NN to generate a normalized output vector based on the context vector.

A method of speech recognition can include receiving, by an encode NN, an audio frame as input and generate a current encoded hidden feature vector as output, generating, by an attend NN and based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, generating, by an annotate NN, the current, second context vector based on the weight vector, the current encoded hidden feature vector, the previous encoded hidden feature vector, and the future encoded hidden feature vector, generating, by a normal NN, a normalized output vector based on the context vector, and translating the normalized output vector to text.

A non-transitory machine-readable medium can include instructions that, when executed by a machine, configure the machine to perform operations comprising receiving, by an encode NN, an audio frame as input and generate a current encoded hidden feature vector as output, generating, by an attend NN and based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, generating, by an annotate NN, the current, second context vector based on the weight vector, the current encoded hidden feature vector, the previous encoded hidden feature vector, and the future encoded hidden feature vector, generating, by a normal NN, a normalized output vector based on the context vector, and translating the normalized output vector to text.

DETAILED DESCRIPTION

Figure 1:
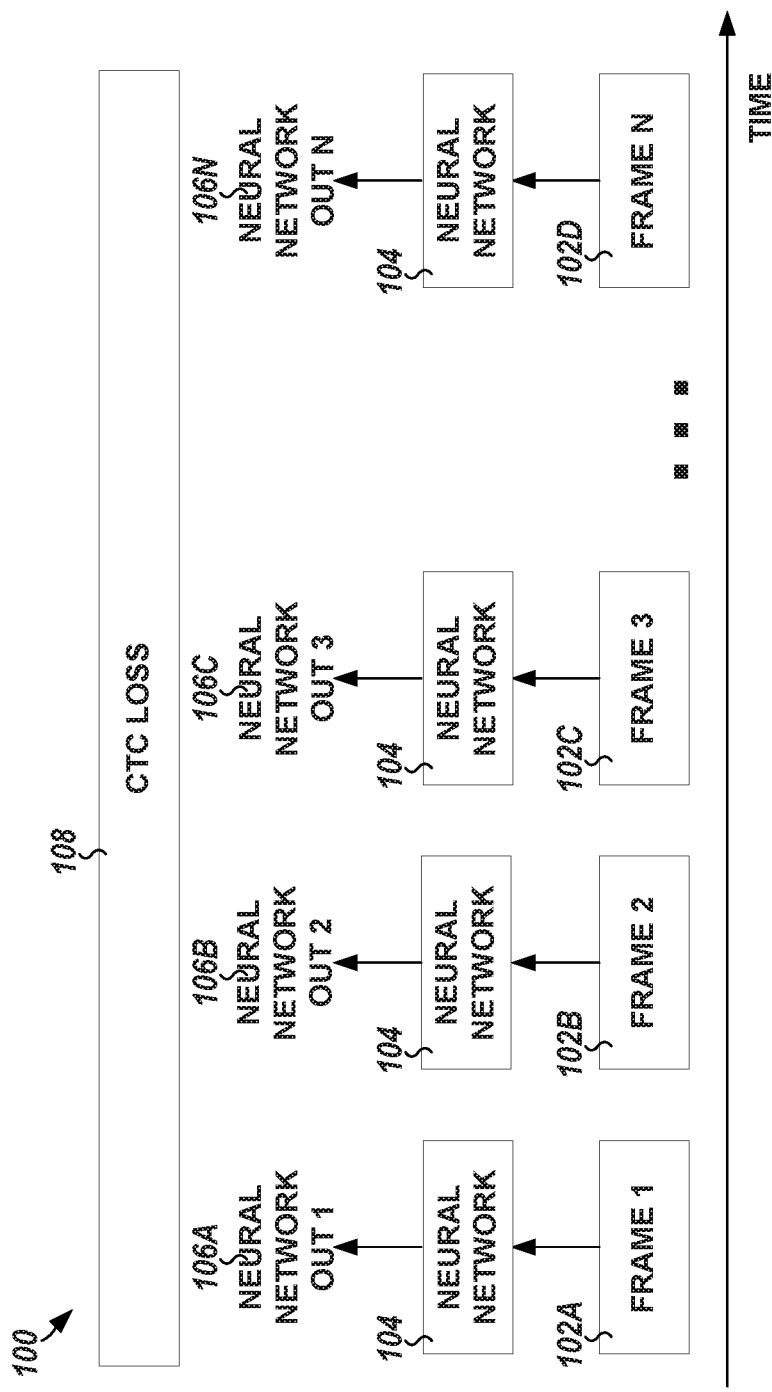
FIG. 1 illustrates, by way of example, a diagram of an embodiment of a connectionist temporal classification (CTC) neural network (NN).

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph if the threshold is not exceeded then, generally, the value is not transmitted to a down-graph neuron and the synaptic connection remains inactive. The process of weighting and testing continues until an output neuron is reached; the pattern and values of the Output neurons constituting the result of the ANN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, Whereas large step sizes may oscillate around the correct value, or exhibit other undesirable behavior. Variable step sizes may be attempted to provide faster convergence without the downsides of large step sizes.

Backpropagation is a technique whereby training data is fed forward through the NN here "forward" means that the data starts at the input neurons and follows the directed graph of neuron connections until the output neurons are reached and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well-known optimization algorithm for back propagation may be used, such as stochastic gradient descent (SGD). Adam, etc.

Connectionist temporal classification (CTC) is a popular audio-to-text speech recognition technology. CTCs may be preferred over traditional hybrid deep neural networks hidden Markov model (DNN-HMM) systems, in part, because they do not require sophisticated linguistic knowledge. In CTC, a neural network (NN) is trained to minimize a CTC objective function. The training uses audio data and desired text output. After training, audio frames are input into a CTC NN (an NN trained to minimize the CTC objective function) and the CTC NN transduces the audio frames directly into text, such as by the CTC NN. However, a current word error rate (WER) of CTC NNs is prohibitively large. The WER is the rate at which the CTC NN produces the incorrect text for a spoken word or phrase input.

Embodiments described herein can advantageously improve the WER of a CTC NN, such as to create a more reliable audio-to-text speech recognition technique. The present techniques comprise an improvement to the CTC NN by adding a feedback mechanism called "attention."

Attention recognizes that a current output and a current input are not necessarily independent of a previous output or a previous input. This contrasts with prior CTC techniques that assume that a current output and a current input are independent of past and future inputs and outputs. By including attention in a CTC NN (e.g., focusing on past, current, and/or future inputs and outputs, rather than limiting inputs and outputs to a current time slice), the WER can be improved. Other improvements and advantages are discussed with reference to the FIGS.

A CTC NN with attention converts audio input to text more accurately than other audio-to-text techniques. Another advantage of a CTC NN with attention is that it is a speaker independent technique. Speaker independent techniques, as previously discussed, provide less hassle for an end-user than a speaker dependent technique, leading to improved user efficiency and increased user interaction performance. Another advantage of a CTC NN with attention is that it provides an end-to-end (E2E) solution for an audio-to-text application. The E2E solution can include a single training to train all of the sub-NNs of the CTC NN with attention, which increases computing speed, conserves memory, and reduces processor load. Other improvements and advantages are discussed with reference to the FIGS.

FIG. 1 illustrates, by way of example, a diagram of an embodiment of a CTC system 100, The CTC system 100 as illustrated includes audio frames 102A, 102B, 102C, and 102D as input to an NN 104. Each of the audio frames 102A-102D can be of a same, specified duration, such as ten milliseconds. Ten milliseconds is merely an example of an audio frame duration, and other durations, such as five milliseconds, twenty milliseconds, twenty-five milliseconds, or a duration greater than, less than; or therebetween are possible.

The NN 104 operates on the consecutive audio frames 102A-102D to produce an NN output 106A, 106B, 106C, and 106D for each of the frames 102A-102D. The NN 104 transduces the output 106a-106D into text, such as one or more phonemes, letters, or words. The NN 104 can be trained using waveforms of audio data and corresponding desired text transcripts of the audio data. A goal of the training can be to minimize a CTC objective function that maps the waveforms to text transcripts. The NN 104 can include a CNN or INN. The NN 104 can perform a normalization of an output vector or series of output vectors (e.g., a SoftMax or other normalization). Thus, the NN 104 can normalize over letters or words depending on the application.

Let $N_w(x)=\{y_k^t\}$ be an NN normalized output where $y_k^t$ is an activation of output unit k at time frame t. The activations over time define a distribution over $L^T$. Sequences over $L^T \triangleq \pi=\{\pi_1, \ldots, \pi_T\}$ are paths. A path probability ultimately determines the word or letter that is transduced. The probability can be calculated (by the NN 104) as $p(\pi|x)=\Pi_{t=1}^T p(\pi_t|x_t) \triangleq \Pi_{t=1}^T y_t(\pi_t)$ for $\pi \in L^T$.

Note that this is a standard CTC formulation. The standard formulation assumes conditional independence between a current output and a previous output. The standard formulation further assumes a conditional independence between the current output and a previous input.

A CTC loss NN 108 translates a path, π, to a transcript(l) (π may not equal l). For example, consider the paths: (1) _____aa_____; (2) aaa_____; (3) _____aaaa_____; and (4) _____aaaaaaa, where "_____" indicates a blank. Each of these paths can be translated to l="a". Thus, π a discrete random variable and $p(\pi_t|x_t)$ defines a probability mass function (PMF) over all possible π. The CTC loss NN 108 selects parameters of the NN 104 such that the paths which yield the correct transcript have high probabilities. Embodiments provide improvements to the CTC NN WER.

Figure 2:
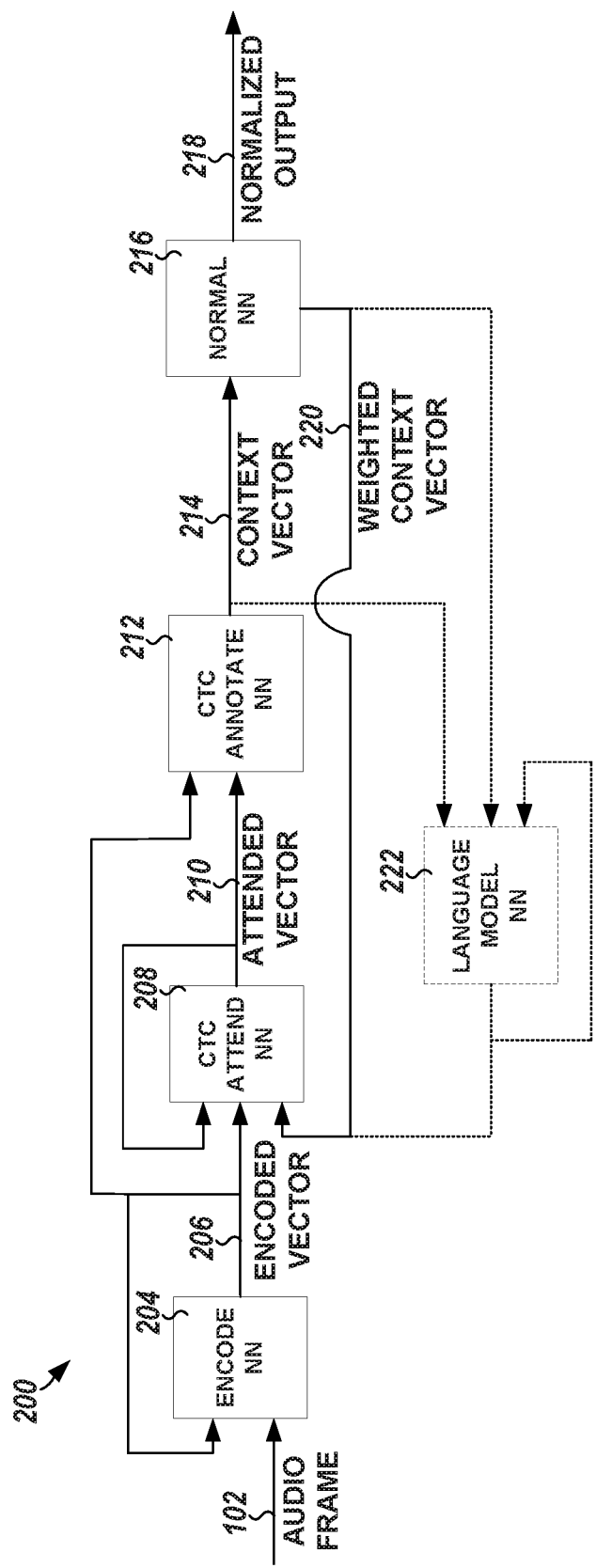
FIG. 2 illustrates, by way of example, a diagram of an embodiment of a system that includes a CTC NN with attention.

FIG. 2 illustrates; by way of example, a diagram of an embodiment of a CTC NN 200 that includes attention. The CTC NN 200 removes the assumption of conditional independence (that consecutive outputs are independent) and hard alignment (that an output is independent of other inputs other than the current input). In removing these assumptions, the WER of the CTC NN 200 can be improved over prior CTC NN systems.

The CTC NN 200 as illustrated includes an encode NN 204, a CTC attend NN 208, a CTC annotate NN 212, and a normal NN 216. The CTC NN 200 can include an optional implicit language model NN 222.

The encode NN 204 transduces raw features to encoded hidden feature vectors. The encode NN 204 can receive a series of audio frames 102 and an encoded vector 206 from a previous time slice as input and produced an encoded vector 206 (e.g., an encoded hidden feature vector) as output. The encoder NN 204 can be implemented using a deep NN, such as a recurrent NN. The encoder NN 204 can include long short-term memory (LSTM) units, gated recurrent units (GRU), or other recurrent units. As used herein, "previous time slice" means an immediately preceding time slice. The immediately preceding time slice operated on an audio frame that immediately precedes the current audio frame in the series of audio frames.

The CTC attend NN 208 can receive the encoded vector 206, a weight vector 210 from the previous time slice, and a weighted context vector 214 from the previous time slice (pre-normalization) as input. The CTC attend NN 208 can produce a weight vector 210 (e.g., a scalar or vector of weights the same dimensions as the encoded vector 206) as output. The CTC attend NN 208 can be trained to learn how much one or more past, current, and future encoded vectors influence the encoded vector 206. The CTC attend NN 208 can generate the weight vector 210 based on the determined influence (e.g., a weight from a previous time slice), a weight vector 210 from a previous time slice, and re weighted context vectors 224.

The CTC annotate NN 212 receives the weight vector 210 and the encoded vector 206 as input, and produces the context vector 214 as output. The context vector 214 can be different for different time slices. The context vector 214 can include a weighted or unweighted sum of encoded vectors 206 from a window of time slices. The window of time slices can include τ time slices before the current time slice, τ time slices after the current time slice, and the current time slice.

The normal NN 216 can receive the context vector 214 as an input. The normal NN 216 can produce a normalized output vector 218 as output. The normal NN 216 can determine a SoftMax or another normalized version of a weighted or un-weighted context vector. In the process of determining the normalized output vector 218, the normal NN 216 can produce a weighted context vector 220. The weighted context vector 220 can include a uniform or non-uniform weighting of the context vector 214.

The implicit language model NN 222 can include an RNN-LM or other architecture, such as can include an LSTM unit with a specified number of memory cells and output dimensions. The implicit language model NN 222 provides context to distinguish words or phrases that sound similar. The context of an output of the implicit language model NN 222 from a previous time slice, the context vector 214, and the weighted context vector 220 provide the language an ability to help separate the similar words or phrases.

The CTC NN of the CTC NN 200 is considered an end-to-end (E2E) NN. An E2E NN can be trained as a unit, such as to train all items of the CTC NN 200 simultaneously. The E2E NN, instead of converting the audio into phonemes and then into text, transduces the audio directly to text. Formally, an E2E speech recognition (SR) system models a posterior distribution p(y|x) by transducing an input sequence of acoustic feature vectors to an output sequence of vectors of posterior probabilities of tokens. For an input sequence of feature vectors $x=(x_1, \ldots, x_T)$ of length T with $x_t \in \mathbb{R}^m$, an E2E SR system transduces the input sequence to an intermediate sequence of hidden feature vectors $h=(h_1, \ldots, h_L)$ of length L with $h_l \in \mathbb{R}^n$. The sequence h undergoes another transduction resulting in an output sequence of vectors of posterior probabilities $y=(y_1, \ldots, y_U)$ of length U with $y_u \in U^K$ such that $\Sigma_k y_u(k)=1$. Here, U=[0, 1] and K=|L| is the cardinality of the label set L. Usually U≤T in E2E systems.

The feedback of the weighted context vector 220 provides a dependence on a prior output (non-normalized) of the CTC NN 200. This feedback provides context to the attend NN 208 in determining an influence the prior output has on the current encoded vector 206. This influence causes the CTC NN 200 to perform speech recognition more accurately than previous CTC NNs and other speech recognition techniques.

Figure 3:
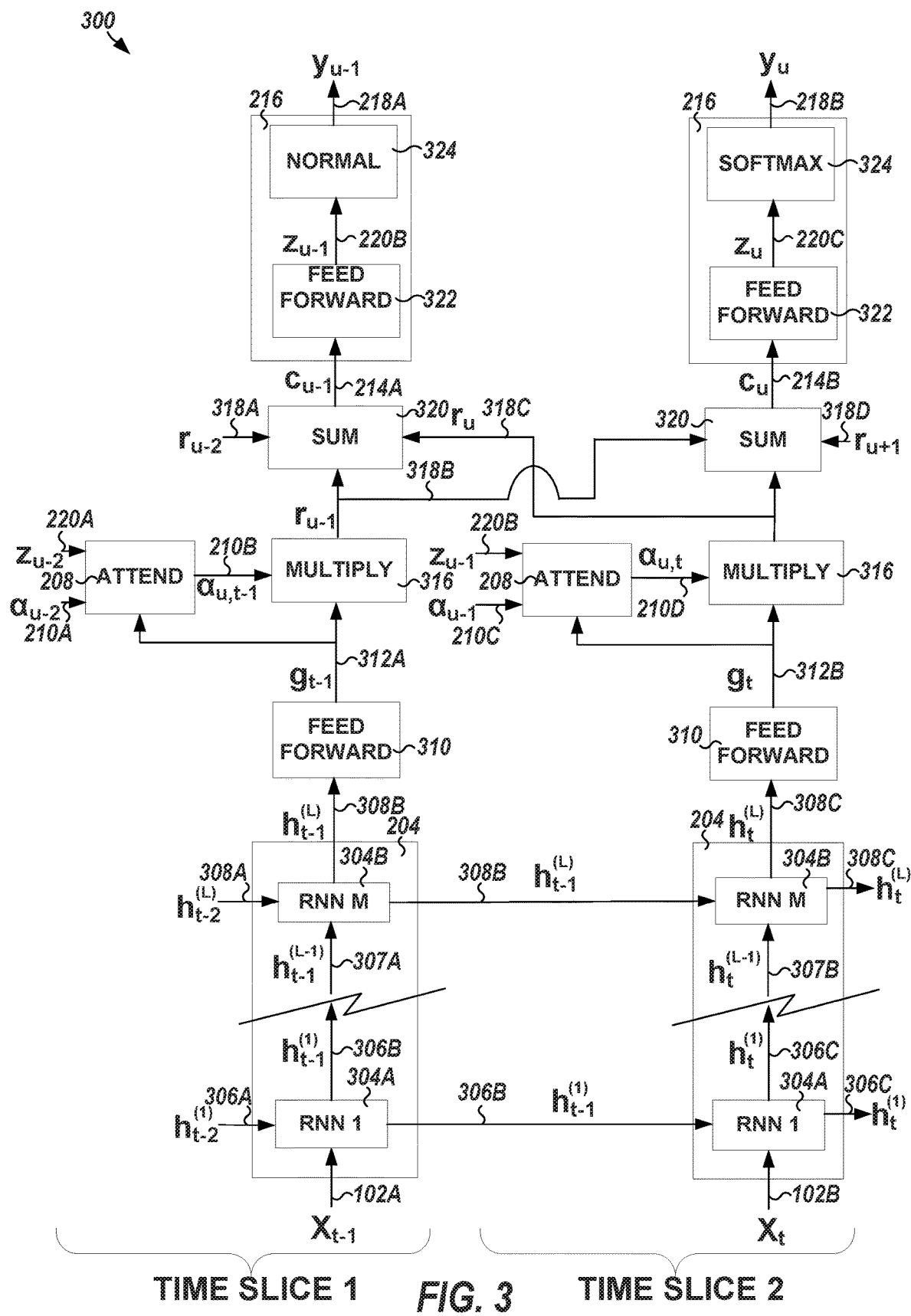
FIG. 3 illustrates, by way of example, a diagram of two consecutive time slices of an embodiment of an end-to-end (E2E) CTC NN with attention.
Figure 4:
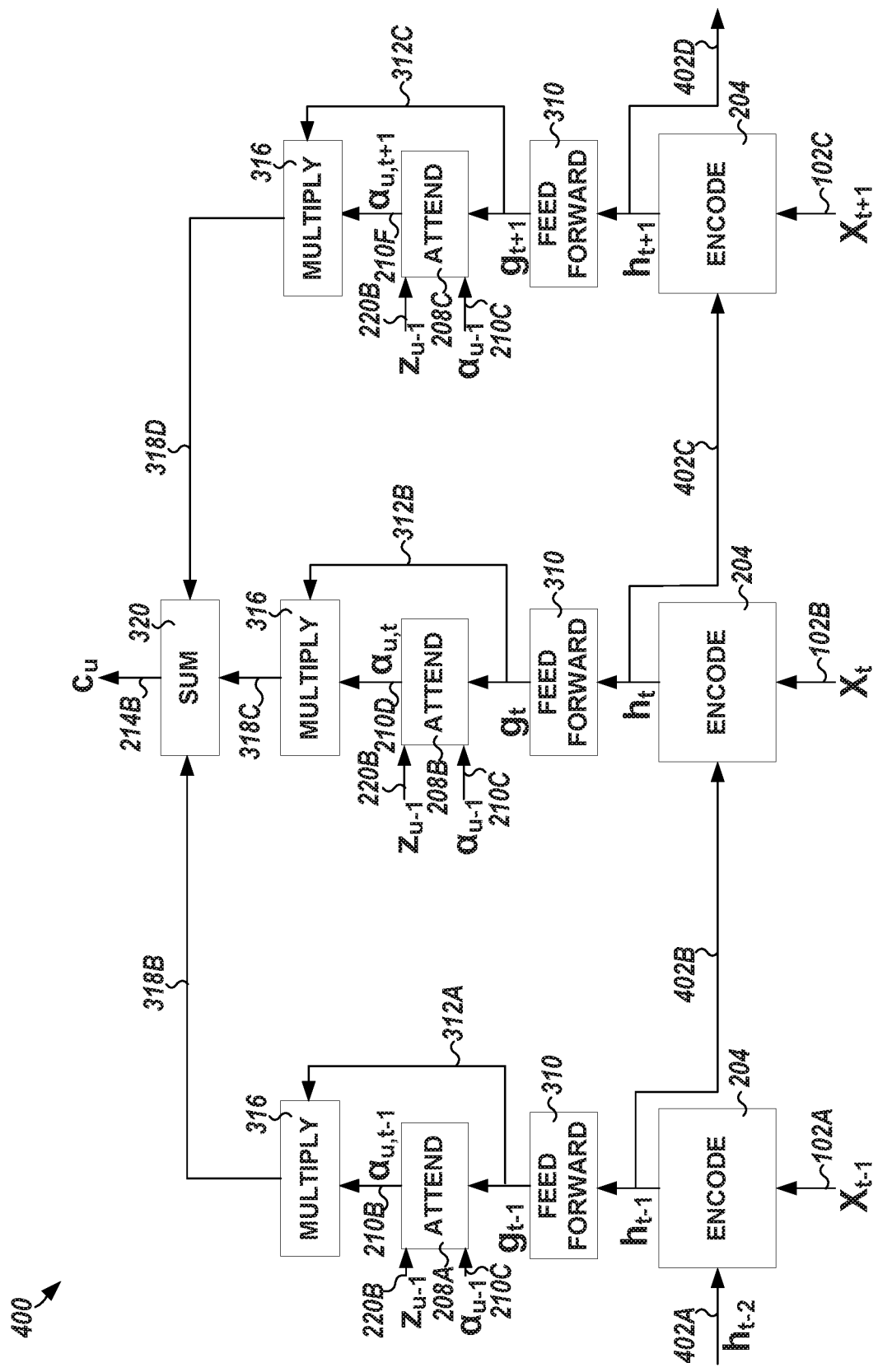
FIG. 4 illustrates, by way of example, a diagram of an embodiment of a portion of a CTC NN.

More details, including mathematical descriptions, of operations and structure of at least some of the items of FIG. 2 are provided with regard to FIGS. 3 and 4.

FIG. 3 illustrates, by way of example, a diagram of an embodiment of an end-to-end (E2E) CTC NN 300 with attention for two consecutive lime slices, a first time slice and a second time slice. The CTC NN 300 includes CTC NN structure at two different times illustrating data forwarded to the structure at a later time slice. The CTC NN 300 includes attention and annotation that helps improve the WER over standard CTC NNs. The CTC NN 300 provides a more detailed view of embodiments of the components of the CTC NN 200. The CTC NN 300 includes the encode NN 204, a feed forward NN 310, the attend NN 208, a multiply NN 316, a sum NN 320, and the normal NN 216. The CTC annotate NN 212 can include the multiply NN 316 and the sum NN 320, but is not depicted in FIG. 3 to not obscure or occlude the view of other items of the CTC NN 300.

The encode NN 204 as illustrated includes RNNs 304A and 304B. Each RNN 304A-304B can represent a "layer" of RNN units, such as can include one or more LSTM units, one or more GRU units, or the like. The RNNs 304A-304B together can form a deep NN with M layers. The audio frame 102A and 102B, X, are consecutive audio frames and the input to the encode NN 204. The first RNN 304A receives the audio frame 102A and an output 306A of the first RNN 304A from a previous time slice. The first RNN 304A produces the output 306B (e.g., an encoded hidden feature vector), which is fed back to the RNN 304A for use in a next time slice and provided to a second RNN, not illustrated in FIG. 3. The last RNN 304B receives an output 307A from a previous RNN in a same time slice and an output the last RNN 304B from a previous time slice. The last RNN 304B produces an output 308B (e.g., an encoded hidden feature vector), which is fed back to the last RNN 304B. The output 308B can be provided to a feed forward NN 310.

The feed forward NN 310 can weight the features of the hidden encoded feature vector (e.g., the output 308B). The weights used can be trained during training. The weights can be updated during execution, such as by using back propagation, such that one or more of the weights can change each time slice. The feed forward NN 310 produces an output 312A that is a weighted hidden encoded feature vector. The output 312A can be provided to the attend NN 208 and a multiply NN 316 (e.g., the annotate NN 212).

The attend NN 208 receives a weighted context vector 220A, a prior weight vector 210A, and the output 312A. The weighted context vector 220A (or other weighted context vector discussed herein) can be input to a implicit language model NN (e.g., the language model NN 222) and the output of the language model NN can be used in place of the weighted context vector 220A.

The attend NN 208 produces a weight vector 210B that indicates how much the output 312A (e.g., a weighted encoded hidden feature vector) influences the context vector 214A. In one or more embodiments, the weight vector 210B can be uniform (e.g., a constant). In one or more other embodiments, the weight vector 210B can include different values for different dimensions, such as to be non-uniform. In such embodiments, different dimensions of the output 312A are weighted differently.

The multiply NN 316 multiplies the output 312A by the weight vector 210B to produce a weighted output 318B. The sum NN 320 receives the weighted output 318B from the current time slice, one or more weighted outputs 318A from a previous time slice, and one or more weighted outputs 318D from a future time slice (an immediately following time slice) as input. The sum NN 320 performs an addition operation the received inputs and produces the context vector 214A for the current time slice.

The context vector 214A is provided to the normal NN 216. The normal NN 216 produces a weighted context vector 220B, using a feed forward. NN 322, and normalizes the weighted context vector 220B to produce a normalized output vector 218A, such as by using a normalizer MN 324.

The weights used by the feed forward NN 322 can be trained or altered by back propagation, like the feed forward NN 310. The normalizer NN 324 can perform a normalization, such as a SoftMax normalization or other normalization. The normalized output vector 218A can include an N-dimensional vector. The values of all entries of the normalized output vector 218A can sum to about one (1).

The operations of the CTC NN 300 in the next time slice ("Time Slice 2") are like the operations of the operations of the CTC NN in the current time slice ("Time Slice 1") with different inputs and sometimes different values (e.g., weight values, or the like) used in performing the operations.

In the Time Slice 2, a next, consecutive audio frame 102B from the audio frame 102A can be input to the encode NN 204. The first RNN 304A receives the audio frame 102B and an output 306B of the first RNN 304A from the previous time slice. The first RNN 304A produces the output 306C (e.g., an encoded hidden feature vector), which is fed back to the RNN 304A for use in a next time slice and provided to a second RNN, not illustrated in FIG. 3. The last RNN 3049 receives an output 307B from a previous RNN in a same time slice and an output the last RNN 304B from a previous time slice. The last RNN 304B produces an output 308C (e.g., an encoded hidden feature vector), which is fed back to the last RNN 304B. The output 3089 can be provided to a feed forward NN 310.

The feed forward NN 310 can weight the features of the hidden encoded feature vector (e.g., the output 308C). The feed forward NN 310 produces an output 312B that is a weighted hidden encoded feature vector. The output 312B can be provided to the attend NN 208 and a multiply NN 316 (e.g., the annotate NN 212).

The attend NN 208 receives the weighted context vector 220B from the previous time slice, a prior weight vector 210C, and the output 312B from the current time slice. As previously discussed, the weighted context vector 220B can be input to an implicit language model NN and the output of the language model NN can be used in place of the respective weighted context vector 220B.

The attend NN 208 produces a weight vector 210D that indicates how much the output 312B influences the context vector 214B. In one or more embodiments, the weight vector 210D can be uniform (e.g., a constant). In one or more other embodiments, the weight vector 210BD can include different values for different dimensions. In such embodiments, different dimensions of the output 312B are weighted differently.

The multiply NN 316 multiplies the output 312B by the weight vector 210D to produce a weighted output 318C. The sum NN 320 receives the weighted output 318C from the current time slice, one or more weighted outputs 318B from a previous time slice, and one or more weighted outputs 318D from a future time slice as input. The sum NN 320 performs an addition operation the received inputs and produces the context vector 214B for the current time slice. Note that the context vector 214B can include a different value than the context vector 214A.

The context vector 214B is provided to the normal NN 216. The normal NN 216 produces a weighted context vector 220C, using a feed forward NN 322, and normalizes the weighted context vector to produce a normalized output vector 218B, such as by using a normahzer NN 324.

FIG. 4 illustrates, by way of example, a diagram of an embodiment of an encode, attention, and annotation portion of a CTC NN 400. The operations of each of the items of the CTC NN 400 are described regarding FIGS. 2-3. An item of the CTC NN 400 with a letter suffix represents a specific instance of that same item in the CTC NN 200 or 300. For example, the attend NN 208A, 208B, and 208C, respectively, represent specific respective instances of the attend NN 208, and so on.

The CTC NN 400 illustrated includes a time window size, τ=1. In such an embodiment, the current context vector 214B is determined based on a weighted output 3123 from a current time slice, a weighted output 312A from a previous time slice, and a weighted output 312C from a future time slice, if τ=2, the current context vector 214B would depend on two prior weighted context vectors and two future weighted context vectors. Other values of τ>2 are possible, such as τ=3, 4, 5, 6, 7, etc.

In the CTC NN, 400 multiple instances of the attend NN 208A, 208B, and 208C can be instantiated. The multiple instances can operate in parallel, such as to perform operations in response to all inputs being present. Since the attend NN 208A-208C depends on the output of an attend NN from a previous time slice to determine the weight vector 210C and an operation of the normal NN 216 (or an operation of the language model NN 222) to determine the weighted context vector 220B, the attend NN 208A-208C cannot operate until the normal NN 216 from the previous time slice has operated on the context vector 214A to produce the weighted context vector 220B (or the language model NN 222 produces an output based on the context vector 214A).

The audio frames 102A-102C are consecutive audio waveforms of a same duration. The audio frames 102A-102C are provided to a respective encoder NN 204. The encode NN 204 receives the audio frames 102A-102C, respectively, and respective outputs 402A-402C of an encode NN from a previous time slice as inputs. The encoder NN 204 produce outputs 402B-402D, respectively (e.g., encoded hidden feature vectors). The feed forward NNs 310A-310C produce weighted outputs 3124-312C, respectively.

The attend NN 208A-208C receives the weighted outputs 312A, the weighted context vector 220B from a previous time slice, and weights 210C from a previous time slice as input. The attend NN 208A-208C produces weights 324B-2.10D, respectively, that indicate how much a corresponding audio frame 102A-102C influences the context vector 2149. This dependence on a past or future audio frame 102A or 102C, respectively, and weighted context vector 2209 makes the CTC NN 400 conditionally dependent on past or future outputs, rather than conditionally independent, as in other CTC NNs.

The multiply NN 316 applies the determined weights 210B-210D to the respective weighted outputs 312A-312C. The sum NN 320 sums outputs 318B-318D of the multiply NN 316 to produce the context vector 2149.

A mathematical description of operations of the CTC NN 200, 300, or 400 is provided. In a CTC NN 200, 300, or 400, the input sequence (number of audio frames, T) and output sequence (number of phonemes or blanks. U) are of the same length, T=U. Indices t and u denote a time step for input and output sequences respectively. It is understood that every input frame $x_t$ generates output $y_t = y_u$.

The CTC NN 200, 300, and 400 can include time convolution features that are not present in other CTC NNs, Consider a rank-3 tensor $W' \in \mathbb{R}^{n_1 \times n_2 \times C}$. For simplicity, assume $n_1=n_2=n$ where n is the dimension of the hidden feature $h_t$. The attend. NN 208 considers a small subsequence of h (or a weighted version of h) rather than the entire sequence. This subsequence will be referred to as the attention window. Its length of the window, D, is 2τ+1 and it is centered around the current time u. Thus, τ represents the length of the window on either side of u. Then du can be computed using Equation 1.

$$c_u = W'^{*}h = \sum_{t=u-\tau}^{t=u+\tau} W_{u-t} h_t \triangleq \sum_{t=u-\tau}^{t=u+\tau}$$
$$g_t = \gamma \sum_{t=u-\tau}^{t=u+\tau} \alpha_{u,t} g_t \qquad \text{Equation 1}$$

Here, $g_t \in \mathbb{R}^n$ represents an encoded (and weighted) vector at time t. The last step of Equation 1 holds when $$\alpha_{u,t} = \frac{1}{D}$$

and $\gamma = D \cdot c_u$ represents a special case of a context vector with uniform attention weights $$\alpha_{u,t} = \frac{1}{D}, t \in [u-\tau, u+\tau].$$

Also, $c_u$ is a result of convolving features h with weights, W', in time. Thus, $c_u$ represents a time convolution feature. This is illustrated in FIG. 4 for the case of τ=1.

To incorporate non-uniform attention in a CTC NN 200, 300, or 400 a non-uniform $\alpha_{u,t}$ can be computed for each t∈[u−τ,u+τ] using the attend NN 208. There is no explicit decoder in the CTC NN 200, 300, or 400 as there is in an RNN-ED. The term $z_u \in \mathbb{R}^K$ can be feedback and provide context for the next time slice of the CTC NN 200, 300, or 400 operation. $z_u$ is an unnormalized SoftMax output (e.g., a weighted context vector) and can be given by Equation 2.

$$z_u = W_{soft} c_u + b_{soft} \qquad \text{Equation 2}$$

$$y_u = \text{Softmax}(z_u) \qquad \text{Equation 3}$$

Where $W_{soft} \in \mathbb{R}^{K \times n}$, $b_{soft} \in \mathbb{R}^K$. The attend NN 208 can perform operations of Equation 4 to produce the weight vector 210.

$$\alpha_u = \text{Attend}(z_{u-1}, \alpha_{u-1}, g) \qquad \text{Equation 4}$$

The Attend function depends on a Score function as in Equation 5, Equation 6, and Equation 7, $$e_{u,t} = \text{Score}(z_{u-1}, \alpha_{u-1}, g_t) \qquad \text{Equation 5}$$

$$\alpha_{u,t} = \frac{\exp(e_{u,t})}{\sum_{t'=1}^{T} \exp(e_{u,t'})} \qquad \text{Equation 6}$$

$$\text{Score}(z_{u-1}, \alpha_{u-1}, g_t) = \qquad \text{Equation 7}$$
$$\begin{cases} v^T \tanh(Uz_{u-1} + Wg_t + b)(\text{content}) \\ v^T \tanh(Uz_{u-1} + Wg_t ++ Vf_{u,t} + b)(\text{hybrid}) \end{cases}$$

Where $f_{u,t} = F * \alpha_{u-1}$, the operation * denotes convolution, and U, W, V, F, and b are learned while training the CTC NN 200, 300, or 400. Content and location information are encoded in $z_{u-1}$ and $\alpha_{u-1}$, respectively. W projects $g_t$ for each t∈[u−τ,u+τ] to a common subspace. Score normalization can be produced by the normal NN 216 in accord with Equation 6. The $\alpha_{u,t}$ can be non-uniform for each t∈[u−τ, u+τ]. The $\alpha_{u,t}$ can be used in Equation 1 to generate the context vector 214. Note that excluding the scale factor γ can be detrimental to performance of the CTC NN 200, 300, or 400.

The performance of the CTC NN 200, 300, or 400 can be improved further by providing more reliable content information from a previous time slice. This is possible by introducing another recurrent network that can use content from one or more previous time slices. The recurrent network can, for example, include the implicit language model NN 222 of FIG. 2. The language model NN 222 can learn an implicit language model. A hidden state of the language model NN 222, $Z_{u-1}^{LM}$, can be provided to the attend NN 208 in place of the weighted context vector 220, $z_{u-1}$ in Equation 5 and Equation 7. The language model NN 222 can include an architecture like an RNN-language model (LM). The input to the LM NN 222 can include a previous weighted context vector, $Z_{u-1}$ and a previous context vector $c_{u-1}$. The LM NN 222 can perform a recurrent function H to determine $z_{u-1}^{LM}$ in accord with Equation 8 and Equation 9.

$$z_{u-1}^{LM} = H(x_{u-1}, z_{u-2}^{LM}), x_{u-1} = \begin{bmatrix} z_{u-1} \\ c_{u-1} \end{bmatrix} \quad \text{Equation 8}$$

$$\alpha_u = \text{Attend}(z_{u-1}^{LM}, \alpha_{u-1}, g) \quad \text{Equation 9}$$

The function H can be modeled using a long short-term memory (LSTM) unit with n memory cells and input and output dimensions set to n+K and n respectively. One problem with $z_{u-1}^{LM}$ is that it encodes the content of a pseudo LM, rather than a real LM. This is at least because the CTC NN 200, 300, or 400 outputs can be interspersed with blank symbols by design. Another problem is that $z_{-1}^{LM}$ is a real-valued vector instead of a one-hot vector. Hence, the learned LM can be referred to as an implicit LM. $\alpha_{u,t}$ can be a scalar term that weights each of the n components of the vector, $g_t$, evenly. In some embodiments, though, $\alpha_{u,t}$ can weight one or more the n components of the vector, $g_t$, differently. Such an $\alpha_{u,t}$ can be produced by the attend NN 208 by computing an n-dimensional score $e_{u,t}$ for each t. Instead of taking an inner product with v in Equation 7, For example, in one case, the scoring function can be determined in accord with Equation 10.

$$e_{u,t} = \tan h(Uz_{u-1} + Wg_t + Vf_{u,t} + b) \quad \text{Equation 10}$$

This can create D column vectors $[e_{u,u-\tau}, \ldots, e_{u,u+\tau}]$ where each $e_{u,t} \in (-1,1)^n$. Let $e_{u,t,j} \in (-1,1)$ be the $j^{th}$ component of the vector $e_{u,t}$. To compute $\alpha_{u,t,j}$ from $e_{u,t,j}$, $e_{u,t,j}$ can be normalized across t keeping j fixed. Thus, $\alpha_{u,t,j}$ can be computed as in Equation 11.

$$\alpha_{u,t,j} = \frac{\exp(e_{u,t,j})}{\sum_{t'=u-\tau}^{u+\tau} \exp(e_{u,t',j})} \text{ for } j = 1, \ldots, n \quad \text{Equation 11}$$

$\alpha_{u,t,j}$ can represent an amount of contribution $g_t(j)$ provides in determining $c_u(j)$. In such embodiments, the context vector 214, $c_u$, can be determined in accord with Equation 12.

$$c_u = \gamma \Sigma_{t=u-\tau}^{u+\tau} \alpha_{u,t} \odot g_t \quad \text{Equation 12}$$

Where ⊙ represents a Hadamard product.

The CTC NN 200, 300, or 400 can provide a better word error rate than CTC NNs that do not include attention. The improvements can include one or more of: (1) time convolution features, such as can be provided by the annotate NN 212, (2) content attention (encoding content information, $Z_{u-1}$, into $\alpha_u$ using the attend NN 208 (e.g., consistent with the content version of Equation 7), (3) hybrid attention (encoding content information, $z_{u-1}$, and location information, $\alpha_{u-1}$, into $\alpha_u$ using the attend NN 208 (e.g., consistent with the hybrid version of Equation 7 or Equation 10), (4) a language model NN 222 operating on the weighted context vector 220, or (5) component-wise attention in which the weights 210 produced by the attend NN 208 operate independently on individual components of the weighted encoded vector 312.

Figure 5:
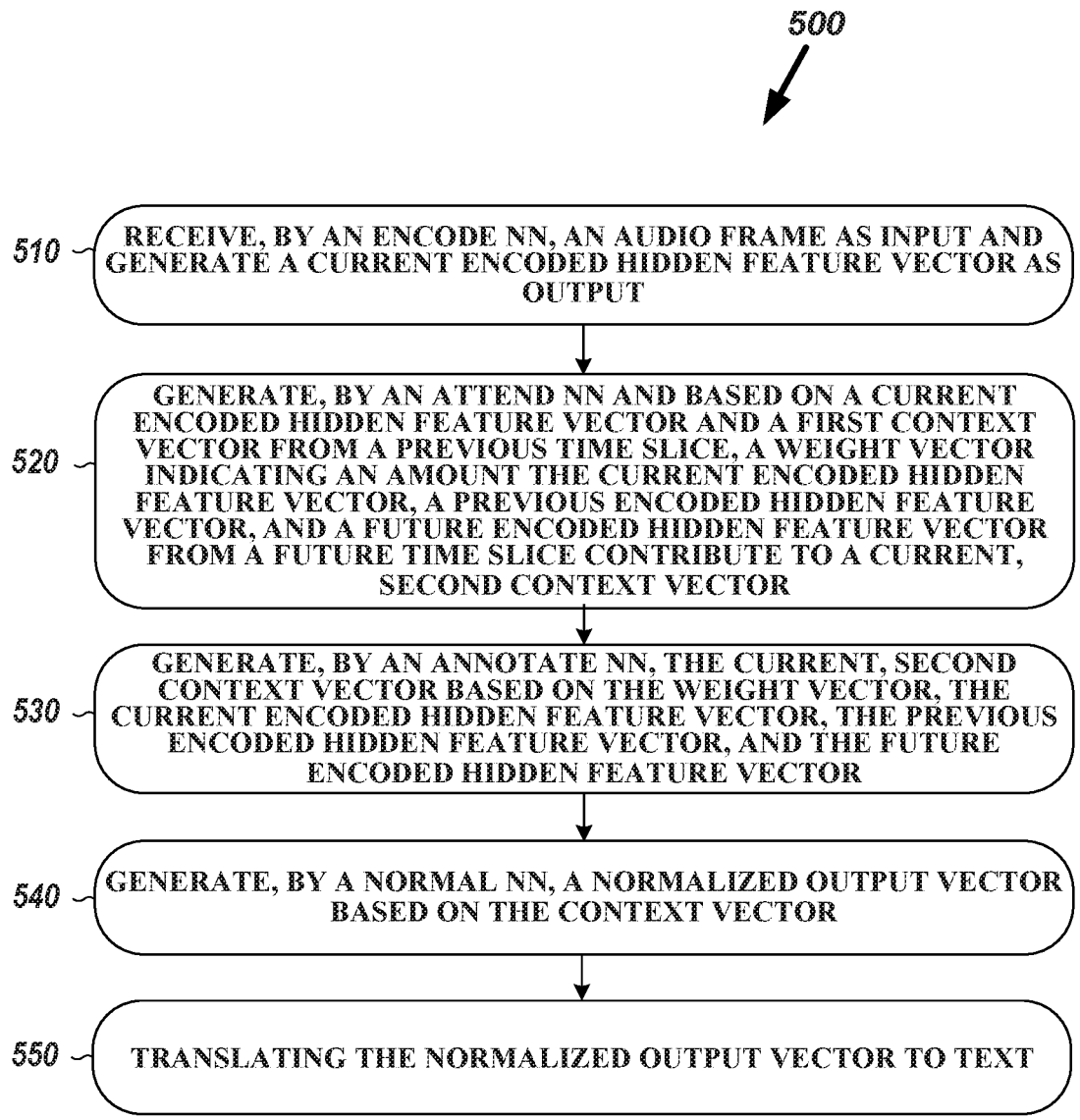
FIG. 5 illustrates, by way of example, a diagram of an embodiment of a method for operating a CTC NN, such as the CTC NN of FIG. 2, 3, or 4.

FIG. 5 illustrates, by way of example, a diagram of an embodiment of a method 500 for operating a CTC NN, such as the CTC NN 200, 300, or 400. The method 500 can improve the WER of a CTC NN over other methods of operating a CTC NN. The method 500 as illustrated includes receiving, by an encode NN, an audio frame as input and generate a current encoded hidden feature vector as output, at operation 510; generating, by an attend NN and based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, at operation 520; generating, by an annotate NN, the current, second context vector based on the weight vector, the current encoded hidden feature vector, the previous encoded hidden feature vector, and the future encoded hidden feature vector, at operation 530; generating, by a normal NN, a normalized output vector based on the context vector, at operation 540; and translating the normalized output vector to text, at operation 550.

The method 500 can further include receiving, by an implicit language model (LM) NN, a weighted context vector from the normal NN and to generate an LM feature vector based on the weighted context vector, wherein the first context vector is the LM feature vector. The method 500 can further include, wherein the weight vector is a first vector, and the attend NN is further to generate the first weight vector based on a second weight vector from a previous time slice. The method 500 can further include generating, by a feed forward NN, a weighted encoded hidden feature vector based on the current encoded hidden feature vector. The method 500 can further include generating, by the attend NN, the weight vector based on the weighted encoded hidden feature vector instead of the current encoded hidden feature vector.

The method 500 can further include non-uniformly altering the second, current context vector component-by-component based on a corresponding component the weight vector. The method 500 can further include, wherein altering the second, current context vector includes a Hadamard product of the weight vector and the encoded hidden feature vector.

The method 500 can further include, wherein the annotate NN generates the second, current context vector uniformly to alter each component of the second, context vector in a same manner. The method 500 can further include, wherein the normal NN includes a feed forward NN to produce a weighted context vector based on the first context vector, and wherein the attend MN is to generate the weight vector based on the weighted context vector instead of the first context vector.

Figure 6:
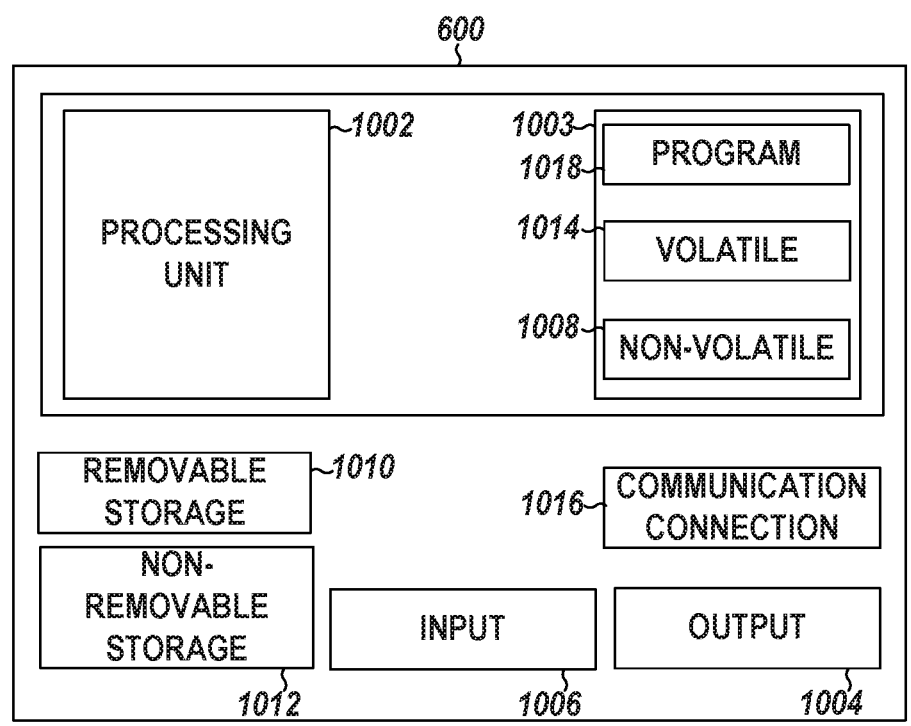
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. One example machine 600 (in the form of a computer), may include a processing unit 1002, memory 1003, removable storage 1010, and non-removable storage 1012. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 1003 may include volatile memory 1014 and non-volatile memory 1008. The machine 600 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, mimetic cassettes, magnetic tape, magnetic disk storage or other magnetic storage devices capable of storing computer-readable instructions for execution to perform functions described herein.

The machine 600 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 600. A hard drive, CD-ROM, and RAM are some examples of articles including a non-transitory computer-readable medium such as a storage device. For example, a computer program 1018 may be used to cause processing unit 1002 to perform one or more methods or algorithms described herein.

ADDITIONAL NOTES AND EXAMPLES

Example 1 includes processing circuitry configured to implement a connectionist temporal classification (CTC) neural network (NN), the CTC NN comprising an encode NN to receive an audio frame as input and generate a current encoded hidden feature vector as output, an attend NN to generate, based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, an annotate NN to generate the current, second context vector based on the weight vector, the current encoded hidden feature vector, the previous encoded hidden feature vector, and the future encoded hidden feature vector, and a normal NN to generate a normalized output vector based on the context vector.

In Example 2, Example 1 further includes, wherein the CTC NN further comprises a language model (LM) NN to receive a weighted context vector from the normal NN and to generate an LM feature vector based on the weighted context vector, wherein the first context vector is the LM feature vector.

In Example 3, at least one of Examples 1-2 further includes, wherein the weight vector is a first vector, and the attend NN is further to generate the first weight vector based on a second weight vector from a previous time slice.

In Example 4, at least one of Examples 1-3 further includes a feed forward NN generate a weighted encoded hidden feature vector based on the current encoded hidden feature vector, and wherein the attend NN is to generate the weight vector based on the weighted encoded hidden feature vector instead of the current encoded hidden feature vector.

In Example 5, at least one of Examples 1-4 further includes, wherein the annotate NN generates the second, current context vector non-uniformly to alter the second, current context vector component-by-component based on a corresponding component the weight vector.

In Example 6, Example 5 further includes, wherein alteration of the second, current context vector includes a Hadamard product of the weight vector and the encoded hidden feature vector.

In Example 7, at least one of Examples 1-6 further includes, wherein the annotate NN generates the second, current context vector uniformly to alter each component of the second, context vector in a same manner.

In Example 8, at least one of Examples 1-7 further includes, wherein the normal NN includes a feed forward NN to produce a weighted context vector based on the first context vector, and wherein the attend NN is to generate the weight vector based on the weighted context vector instead of the first context vector.

In Example 9, at least one of Examples 1-8 further includes, wherein the encode NN includes a recurrent NN.

Example 10 includes a method of speech recognition comprising receiving, by an encode NN, an audio frame as input and generate a current encoded hidden feature vector as output, generating, by an attend NN and based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, generating, by an annotate NN, the current, second context vector based on the weight vector, the current encoded hidden feature vector, the previous encoded hidden feature vector, and the future encoded hidden feature vector, generating, by a normal NN, a normalized output vector based on the context vector, and translating the normalized output vector to text.

In Example 11, Example 10 further includes receiving, by a language model (LM) NN, a weighted context vector from the normal NN and to generate an LM feature vector based on the weighted context vector, wherein the first context vector is the LM feature vector.

In Example 12, at least one of Examples 10-11 further includes, wherein the weight vector is a first vector, and the attend NN is further to generate the first weight vector based on a second weight vector from a previous time slice.

In Example 13, at least one of Examples 10-11 further includes generating, by a feed forward NN, a weighted encoded hidden feature vector based on the current encoded hidden feature vector, and generating, by the attend NN, the weight vector based on the weighted encoded hidden feature vector instead of the current encoded hidden feature vector.

In Example 14, at least one of Examples 10-13 further includes non-uniformly altering the second, current context vector component-by-component based on a corresponding component the weight vector.

In Example 15, Example 14 further includes, wherein altering the second, current context vector includes a Hadamard product of the weight vector and the encoded hidden feature vector.

Example 16 includes a non-transitory machine-readable medium including instructions that, when executed by a machine, configure the machine to perform operations comprising receiving, by an encode NN, an audio frame as input and generate a current encoded hidden feature vector as output, generating, by an attend NN and based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector, generating, by an annotate NN, the current, second context vector based on the weight vector, the current encoded hidden feature vector, the previous encoded hidden feature vector, and the future encoded hidden feature vector, generating, by a normal NN, a normalized output vector based on the context vector, and translating the normalized output vector to text.

In Example 17, Example 16 further includes, wherein the annotate NN generates the second, current context vector uniformly to alter each component of the second, context vector in a same manner.

In Example 18, at least one of Examples 16-17 further includes, wherein the normal NN includes a feed forward NN to produce a weighted context vector based on the first context vector, and wherein the attend NN is to generate the weight vector based on the weighted context vector instead of the first context vector.

In Example 19, at least one of Examples 16-18 further includes, receiving, by a language model (LM) NN, a weighted context vector from the normal NN and to generate an LM feature vector based on the weighted context vector, wherein the first context vector is the LM feature vector.

In Example 20, at least one of Examples 16-19 further includes non-uniformly altering the second, current context vector component-by-component based on a corresponding component the weight vector.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. Processing circuitry configured to implement a connectionist temporal classification (CTC) neural network (NN), the CTC NN comprising:

an encode NN to receive an audio frame as input and generate a current encoded hidden feature vector as output;
an attend NN to generate, based on the current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector;
an annotate NN to generate the current, second context vector based on the weight vector, the current encoded hidden feature vector, the previous encoded hidden feature vector, and the future encoded hidden feature vector; and
a normal NN to generate a normalized output vector based on the context vector.

2. The processing circuitry of claim 1, wherein the CTC NN further comprises a language model (LM) NN to receive a weighted context vector from the normal NN and to generate an LM feature vector based on the weighted context vector, wherein the first context vector is the LM feature vector.

3. The processing circuitry of claim 1, wherein:
the weight vector is a first vector; and
the attend NN is further to generate the first weight vector based on a second weight vector from a previous time slice.

4. The processing circuitry of claim 1, wherein CTC NN further comprises:
a feed forward NN generate a weighted encoded hidden feature vector based on the current encoded hidden feature vector; and
wherein the attend NN is to generate the weight vector based on the weighted encoded hidden feature vector instead of the current encoded hidden feature vector.

5. The processing circuitry of claim 1, wherein the annotate NN generates the second, current context vector non-uniformly to alter the second, current context vector component-by-component based on a corresponding component the weight vector.

6. The processing circuitry of claims, wherein alteration of the second, current context vector includes a Hadamard product of the weight vector and the encoded hidden feature vector.

7. The processing circuitry of claim 1, wherein the annotate NN generates the second; current context vector uniformly to alter each component of the second, context vector in a same manner.

8. The processing circuitry of claim 1, wherein the normal NN includes a feed forward NN to produce a weighted context vector based on the first context vector, and wherein the attend NN is to generate the weight vector based on the weighted context vector instead of the first context vector.

9. The processing circuitry of claim 1, wherein the encode NN includes a recurrent NN.

10. A method of speech recognition comprising: receiving, by an encode neural network (NN), an audio frame as input and generate a current encoded hidden feature vector as output; generating, by an attend NN and based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector; generating, by an annotate NN, the current; second context vector based on the weight vector, the current encoded hidden feature vector, the previous encoded hidden feature vector, and the future encoded hidden feature vector; generating, by a normal NN, a normalized output vector based on the context vector; and translating the normalized output vector to text.

11. The method of claim 10, further comprising receiving, by a language model (LM) NN, a weighted context vector from the normal NN and to generate an LM feature vector based on the weighted context vector, wherein the first context vector is the LM feature vector.

12. The method of claim 10, wherein:
the weight vector is a first vector; and
the attend NN is further to generate the first weight vector based on a second weight vector from a previous time slice.

13. The method of claim 10, further comprising:
generating, by a feed forward NN, a weighted encoded hidden feature vector based on the current encoded hidden feature vector; and
generating, by the attend NN, the weight vector based on the weighted encoded hidden feature vector instead of the current encoded hidden feature vector.

14. The method of claim 10, further comprising non-uniformly altering the second, current context vector component-by-component based on a corresponding component the weight vector.

15. The method of claim 14, wherein altering the second, current context vector includes a Hadamard product of the weight vector and the encoded hidden feature vector.

16. A non-transitory machine-readable medium including instructions that, when executed by a machine, configure the machine to perform operations comprising: receiving, by an encode neural network (NN), an audio frame as input and generate a current encoded hidden feature vector as output; generating, by an attend NN and based on a current encoded hidden feature vector and a first context vector from a previous time slice, a weight vector indicating an amount the current encoded hidden feature vector, a previous encoded hidden feature vector, and a future encoded hidden feature vector from a future time slice contribute to a current, second context vector; generating, by an annotate NN, the current, second context vector based on the weight vector, the current encoded hidden feature vector, the previous encoded hidden feature vector, and the future encoded hidden feature vector; generating, by a normal NN, a normalized output vector based on the context vector; and translating the normalized output vector to text.

17. The non-transitory machine-readable medium of claim 16, wherein the annotate NN generates the second, current context vector uniformly to alter each component of the second, context vector in a same manner.

18. The non-transitory machine-readable medium of claim 16, wherein the normal NN includes a feed forward NN to produce a weighted context vector based on the first context vector, and wherein the attend NN is to generate the weight vector based on the weighted context vector instead of the first context vector.

19. The non-transitory machine-readable medium of claim 16, further comprising receiving, by a language model (LM) NN, a weighted context vector from the normal NN and to generate an LM feature vector based on the weighted context vector, wherein the first context vector is the LM feature vector.

20. The non-transitory machine-readable medium of claim 16, further comprising non-uniformly altering the second, current context vector component-by-component based on a corresponding component the weight.

* * * * *